United States Patent [19]
Ciurea

[11] 3,808,825
[45] May 7, 1974

[54] COMBINATION CUP COOLER AND WARMER

[75] Inventor: Serban Ciurea, Woodside, N.Y.

[73] Assignee: The Raymond Lee Organization, Inc., New York, N.Y. ; a part interest

[22] Filed: May 30, 1973

[21] Appl. No.: 365,341

[52] U.S. Cl. .................................................. 62/3
[51] Int. Cl. .......................................... F25b 21/02
[58] Field of Search .................................... 62/3

[56] References Cited
UNITED STATES PATENTS

| | | | |
|---|---|---|---|
| 2,991,628 | 7/1961 | Tuck | 62/3 |
| 3,310,953 | 3/1967 | Rait | 62/3 |
| 3,314,242 | 4/1967 | Lefferts | 62/3 |

*Primary Examiner*—William J. Wye
*Attorney, Agent, or Firm*—Howard I. Podell

[57] ABSTRACT

A device which may be utilized to warm one cup of liquid and simultaneously cool a second cup of liquid, with the device employing thermoelectric means to effect the heat transfer.

2 Claims, 3 Drawing Figures

PATENTED MAY 7 1974 3,808,825
FIG. 1
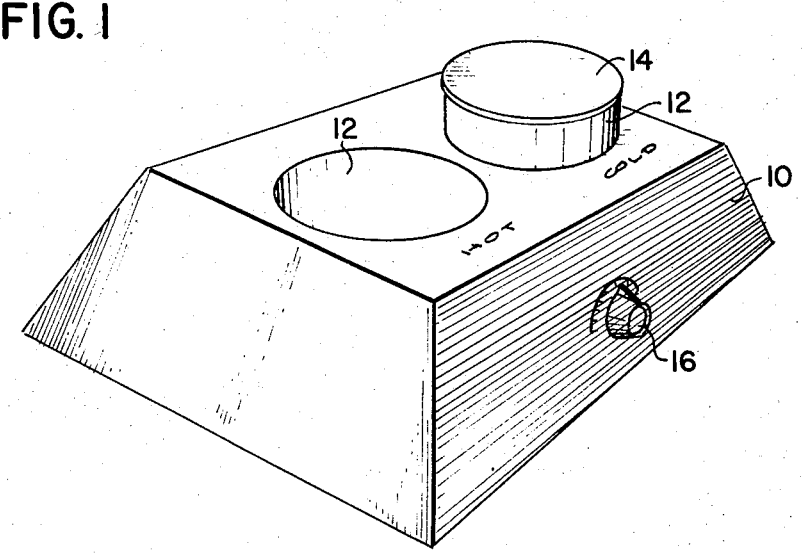
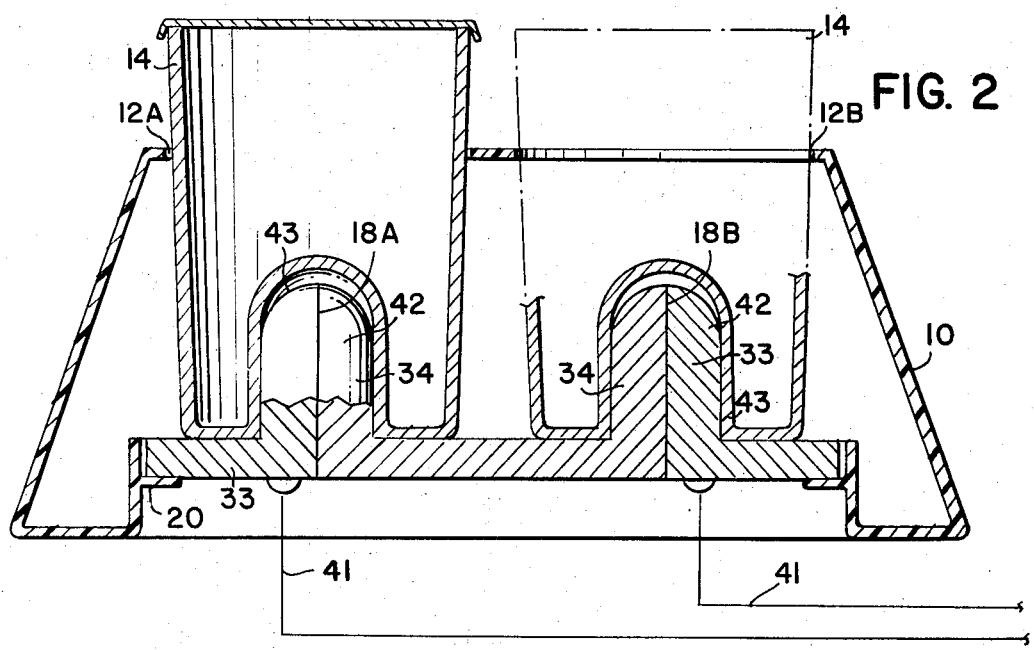
FIG. 2
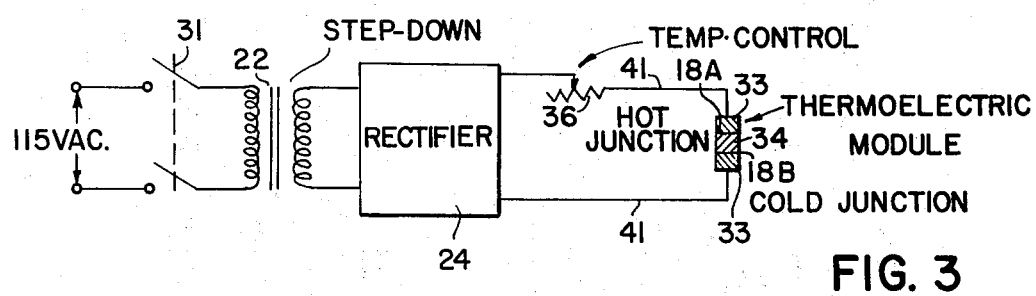
FIG. 3

COMBINATION CUP COOLER AND WARMER

SUMMARY OF THE INVENTION

This invention relates to a thermoelectric device for heating one cup of liquid and simultaneously cooling a second cup of liquid.

The advantage of this invention is that a cup of liquid can be brought to and maintained at a desired temperature in a convenient location. As an example, a user can keep both a cup of hot liquid and a cup of cold liquid within reach of his bed during the night so that he can drink either said liquid at the preferred temperature when so desired.

The invention comprises a cabinet with two recesses in each of which a cup of liquid may be placed. Thermoelectric means are used to cool one recess and heat the other.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the device;
FIG. 2 is a cross-section view of the device; and
FIG. 3 is a schematic drawing of the circuitry used within the device.

DESCRIPTION OF THE PREFERRED EMBODIMENT

Turning now descriptively to the drawings, in which similar reference characters denote similar elements through the several views, FIGS. 1 and 2 illustrate the device 10 which includes two circular cavities 12 in each of which a cup 14 may be placed. One cavity 12A is used to heat the enclosed cup 14 while the other cavity 12B is used to cool enclosed cup 14. A temperature control 16 is used to regulate the temperature of the cups 14 in the cavities 12. With the temperature control 16 set to a higher reading, the hot cavity 12A becomes hotter and the cold cavity 12B becomes colder.

As depicted in FIG. 2, each cavity 12 has one junction of a thermocouple built into the base 20 of the cavity 12. The hot cavity 12A has the hot junction 18A of the thermocouple built within, while the cold cavity 12B has the cold junction 18B of the thermocouple built within it. The thermocouple junctions 18A and 18B are shaped in the form of vertical finger sections 42 which fit into concave recesses 43 in the bottom of cups 14 so as to increase the area of contact between the cups 14 and the thermocouple junctions.

As shown in FIG. 3, incoming AC supply current first flows through a double pole switch 31 step-down transformer 22 and the lower voltage current is then rectified by the rectifier 24. The rectified DC current then flows through the thermocouple formed of two conductive materials 33 and 34 of varying thermoelectric characteristics. The two materials 33 and 34 are joined together in a series configuration, with the electric current flow passing from the rectifier through the first material 33, then passing through the hot junction 18A where the second material 34 joins the first material 33, then passing through the cold junction 18B where the second material 34 joins a separate section of the first material 33 and back to the rectifier 24 variable resistor 36. Variable resistor 36 operated by control knob 16 is used to control the flow of current and the temperatures of the two thermoelectric junctions. As the resistance of the variable resistor 28 is decreased the hot junction 18A becomes hotter and the cold junction 18B becomes colder. Reversal of the rectifier output leads reverses the location of the hot and cold junctions 18A and 18B.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A device for simultaneously maintaining two containers fitted in the device at different temperatures from each other by means of thermoelectric energy, said device being in the form of a base fitted with two cylindrical cavities each open to the top of the base of a size to permit fitting a cylindrical cup into each said cavity with the bottom of each cylindrical cavity fitted with a thermoelectric junction and with the two thermoelectric junctions of the unit connected electrically in series to each other together with electrical means for passing a direct electric current through the two thermoelectric junctions, with the thermoelectric junctions each being formed of two electric conductive materials of different thermoelectric characteristics so that the passage of electric current in one direction through such a junction generates heat while the passage of current in the opposite direction removes heat from the junction so as to refrigerate the junction and with the two thermoelectric junctions formed so that the passage of a direct electric current through both thermoelectric junctions connected in series acts to increase the temperature at one junction and to reduce the temperature at the other junction such that a container inserted in one cavity will be heated and another container inserted in the other cavity will be cooled with direct electric current flows through the thermoelectric junctions of the device.

2. The combination as recited in claim 1 in which each thermoelectric junction is shaped in the form of a convex finger rising up from the base of the cavity in which the junctions is mounted so as to provide a greater external area of the thermoelectric junction in contact with a container the bottom of which is shaped with a mating concave surface so as to fit around the convex protrusion of the thermoelectric junction.

* * * * *